United States Patent Office 3,354,084
Patented Nov. 21, 1967

3,354,084
AQUEOUS GEL OF WATER-SWELLABLE ACRYLIC POLYMER AND NON-IONIC FILLER
Melvin F. Katzer, Danville, Calif., assignor to The Dow Chemical Company, Midland, Mich., a corporation of Delaware
No Drawing. Filed June 24, 1964, Ser. No. 377,533
7 Claims. (Cl. 252—2)

The present invention relates to a water-swellable polymer composition, and more particularly, the invention concerns an aqueous gel having enhanced viscosity and resistance to degradation under sunlight.

It is known to employ water-swellable acrylic copolymers to thicken water used in fighting fires. For example, such thickened or gelled water is applied to fuel which may lie in the path of a forest fire. The gelled water blanket thus formed provides a more effective deterrent to the advance of the fire than just water, which quickly runs off the fuel.

In as much as the viscosity of the thickened water has a significant bearing on the degree of success achieved in fighting fires using this technique, it is an object of the invention to provide aqueous gels having enhanced viscosities whereby runoff is further minimized.

Another problem connected with the use of the aforementioned water-swellable acrylic copolymers as gelling agents for water, results from the tendency of such copolymers to rapidly deteriorate in the presence of sunlight. Illustratively, aqueous gels of such copolymers may lose as much as 90 percent of their initial viscosity within a few hours of exposure to direct sunlight. Thus, it is also desirable, and an object of the present invention to provide light stabilized, water-swellable acrylic copolymers and more particularly, it is an object to provide viscous aqueous gels having extended effective lives as fire retardants under sunlight.

The above objects, and other benefits as will become apparent hereinafter, are accomplished in the present invention.

It has been discovered that lightly crosslinked, particulate, water-swellable, acrylic polymers in admixture with a finely divided, essentially nonionic solid, insoluble in water and opaque to light, produce aqueous gels having enhanced viscosity properties. More specifically, the improved water-swellable acrylic polymer composition comprises 1 part by weight of the water-swellable polymer uniformly admixed with from about 0.1 to about 2 parts by weight of the finely divided solid.

When the aforementioned polymer-solid admixture is incorporated into water in the amount from about 0.05 to about 2 percent based on the weight of the water, a gelled dispersion of discrete water-swollen polymer gels is obtained. The presence of the finely divided solid between the water-swollen polymer gels apparently decreases the relative mobility of the gels, thus increasing the viscosity of the dispersion, and the opacity imparted to the composition stabilizes the interior of the aqueous polymer gel against light induced degradation.

Optionally from about 0.01 up to 0.3 part by weight of a non-ionic or anionic, water-soluble, dye is incorporated into the aforementioned admixture. The dye further aids in the light stabilization of the aqueous gels as well as rendering them more visible.

Illustrative of finely divided, opaque, and essentially non-ionic solids useful in the invention are powdered aluminum, kaolin, barium sulfate, lead carbonate, lithopone, diatomaceous earth, alumina, silica gel, chromic oxide, titanium dioxide, and calcium silicate. The solid is considered essentially non-ionic for the purpose of the present invention if the resistivity of an aqueous slurry of the solid containing 0.2 percent by weight of the solid is at least about 50,000 ohms as measured in a conventional conductivity cell. Solids of a stronger ionic character tend to substantially diminish the effective gel capacity of the polymer. The gel capacity is determined by dispersing a given weight of the polymer in an amount of distilled water in excess of that required to completely swell the polymer particles. Subsequently any free water is drained from the gelled polymer dispersion and the weight of the remaining gel ascertained. The quotient of this weight divided by the initial weight of the dry polymer yields the gel capacity. Polymers most useful in the invention have a gel capacity of at least about 200 and preferably about 1,000 to 1,500 or higher.

The presence of one or more of the aforementioned finely divided solids increases the viscosity of a given dispersion of the copolymer but by far the most surprising and unexpected improvement in this regard is achieved with the use of titanium dioxide. While viscosity enhancement utilizing some of the better of the aforementioned finely divided solids is as much as 100 to 300 percent of the viscosity of the copolymer dispersion without the presence of the finely divided solid, the optimum use of titanium dioxide increases the viscosity of such solutions by a factor of 5 or more.

Exemplary of the water-swellable acrylic polymer utilized in the invention are copolymers of water-soluble monomers having the general formula.

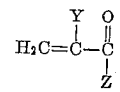

wherein Y is ethyl, methyl or hydrogen, Z is an amide group, an alkyl or dialkyl substituted amide group wherein the alkyls may independently contain from 1 to 4 carbons, or an —OM group wherein M is an alkali metal or ammonium group. One or more of such monomers are copolymerized with a small amount of a cross-linking polyfunctional ethylenically unsaturated monomer. The amount of the cross-linker used may vary from about 0.005 up to as much as about 5 percent based on the weight of the acrylic monomer. Preferably the amount of chemical cross-linker is within the range from about 0.05 to about 0.7 percent based on the weight of the acrylic monomer.

Illustrative of such polyfunctional monomers are methylenebisacrylamide, N,N - diallylacrylamide, diallylamine, diallylmaleate, ethylene glycol dimethacrylate, divinylbenzene, divinyl ether of diethylene glycol, trivinylbenzene, and like materials having more than one polymerizable double bond.

Suitable methods of the preparation of such polymers are taught for example in U.S. Patent 2,810,716 and British Patent 719,330. Essentially equivalent, lightly cross-linked, water-swellable, polymers can also be produced by subjecting a dispersion of the water-soluble monomers to high energy ionizing radiation which, properly applied, performs the same cross-linking function in the polymerization system as the poly-functional monomer.

The water-swellable polymers of concern herein are characterized as being particulate and water-insoluble but uniformly dispersible in water. This means the polymer particles imbibe water to become discrete swollen gels but do not form a solution in water which is infinitely dilutable. At some point upon the addition of further amounts of water, the dispersion will separate into distinct gel and water phases. The particle size of the dry copolymer should be small enough to pass through a 20 mesh screen of the Tyler screen series. Preferably, however, the particle size should be large enough to be substantially retained as a 200 mesh screen. It has been found that particle sizes within this range promote the maximum gel thicknes. Smaller particles tend to produce thinner protective films and larger particles are often slow in achieving full gel capacity.

The following examples illustrate various aspects of the present invention but the conditions of operation illustrated thereby should not be considered as being limitations on the invention unless delineated in the claims appended hereto.

Example 1

A series of aqueous gels was prepared containing 0.2 percent by weight of a water-swellable acrylamide copolymer. The particular copolymer used was obtained by copolymerizing acrylamide with about 0.1 percent by weight, based on the weight of the acrylamide, of methylenebisacrylamide and hydrolyzing about 25 percent of the initially available carboxamide groups to sodium carboxylate groups subsequent to polymerization of the copolymer. A dispersion of the copolymer was prepared in a simulated hard water containing 50 parts per million sodium sulfate and 100 parts per million of calcium chloride.

One such dispersion thus prepared was exposed to light through glass for an extended period. Another 0.2 percent dispersion of the water-swellable polymer was made up containing 500 parts per million parts by weight of total dispersion of titanium dioxide and 60 parts per million parts by weight of total dispersion of a rhodamine dye. This dispersion was likewise subjected to radiation of light over an extended period of time. The light sources were indirect sunlight and fluorescent lighting.

The viscosities of the dispersions were measured initially and at intervals throughout the period of exposure to light. The initial viscosity of the untreated polymer dispersion was about 1,000 centipoises, as measured with a Model R.V.F. Brookfield Viscosimeter using a No. 4 spindle rotated at 20 r.p.m.; while the viscosity of the dispersion containing titanium dioxide was about 1,600 centipoises. Thereafter, the untreated polymer dispersion underwent an increase in viscosity up to a maximum of about 4,000 centipoises, which was achieved after about 110 hours. From this maximum, the viscosity of the dispersion degenerated until at 1,150 hours the viscosity had deteriorated to 700 centipoises. The copolymer dispersion containing titanium dioxide and the rhodamine dye achieved a maximum viscosity of about 2,500 centipoises after 165 hours and this viscosity was still being maintained at 1,150 hours.

Similar stabilization of gel viscosity occurs when the rhodamine "B" dye is omitted from the formulation.

The foregoing effects, which were achieved in the absence of direct sunlight or other direct ultraviolet radiation, are greatly accelerated when such direct radiation is present. For instance, direct exposure to sunlight or ultraviolet lamp radiation usually causes a serious loss in viscosity of an untreated copolymer dispersion within about 2 to 3 hours. When the finely divided opaque solid is present, the life of the aqueous copolymer gel is at least doubled, thereby rendering it substantially more effective as a fire retarding barrier.

Example 2

To illustrate the enhanced viscosity effect achieved through the utilization of finely divided, opaque solids, direct viscosity measurements were made on a series of acrylamide copolymer dispersions with a Model R.V.F. Brookfield viscosimeter employing a No. 2 spindle rotated at 20 r.p.m. The copolymer dispersion contained 0.1 percent by weight of the water-swellable polymer utilized in the above example. The viscosity of the untreated copolymer dispersion along with the viscosities of the various dispersions containing 2000 p.p.m. of different finely divided, opaque solids or pigments are set forth in the following table.

TABLE 1

| Test No. | Finely Divided Solid | Viscosity (cps.) |
| --- | --- | --- |
| 1 | None | 650 |
| 2 | Alumina | 1,500 |
| 3 | Kaolin | 2,300 |
| 4 | Silica Gel | 900 |
| 5 | Calcium Silicate (Cab-O-Sil brand) | 2,600 |
| 6 | TiO$_2$ rutile [1] | 4,400 |
| 7 | TiO$_2$ rutile [2] | 6,200 |

[1] Manufactured by duPont.
[2] Manufactured by Dow.

The above data illustrate the viscosity enhancement achieved with the use of finely divided solids and also the most unique effect achieved by using titanium dioxide.

In addition to the aforementioned water-swellable acrylamide copolymers, other water-swellable acrylic polymers useful herein include interpolymers of alkali metal acrylates and methacrylates reacted with a lightly cross-linking amount of a diethylenically unsaturated monomer copolymerizable therewith or cross-linking high energy ionizing radiation. Also useful are lightly cross-linked polymers such as the above containing optional minor proportions, e.g., 0 up to 40 percent by weight or so of other monomers copolymerizable with sodium acrylate or acrylamide. Suitable optional comonomers for the preparation of such interpolymers include N-vinyl-2-oxazolidinone, N-vinyl-pyrrolidone, sodium styrene sulfonate, potassium sulfoethyl acrylate to mention a few suitable water-soluble comonomers. Particularly preferred are essentially non-ionic and anionic comonomers. Also essentially water-insoluble comonomers can be used, such as styrene, methyl methacrylate, ethyl methacrylate, acrylonitrile, vinyl acetate and the like.

What is claimed is:

1. A gelled aqueous dispersion comprising, in admixture, water and from about 0.05 up to about 2 percent by weight, based on the weight of water, of an admixture of one part by weight of a particulate, water-swellable acrylic polymer and from about 0.1 to about 2 parts by weight of a finely divided, essentially non-ionic solid insoluble in water and opaque to light.

2. A composition as in claim 1 wherein the finely divided solid is titanium dioxide.

3. A composition as in claim 1 wherein the particulate, water-swellable acrylic polymer is small enough to pass a 20 mesh screen and is substantially retained on a 200 mesh screen of the Tyler series.

4. A composition as in claim 1 wherein the water-swellable acrylic polymer is a lightly cross-linked acrylamide copolymer.

5. A gelled aqueous dispersion comprising, in admixture, water and from about 0.05 up to about 2 percent by weight, based on the weight of water, of an admixture of one part by weight of a particulate, water-swellable acrylic polymer and from about 0.1 to about 2 parts by weight of a finely divided, essentially non-ionic solid insoluble in water and opaque to light, and from about 0.01 up to about 0.3 part by weight of a dye selected from the group consisting of non-ionic and anionic, water-soluble dyes.

6. A method for fighting fores fires which comprises applying to fuel in the path of the fire a water dispersion of an admixture of 1 part by weight of a particulate, water-swellable acrylic polymer and from about 0.1 up to 2 parts by weight of a finely divided, essentially non-ionic solid insoluble in water and opaque to light.

7. A method as in claim 6 wherein the admixture contains an additional ingredient of about 0.01 up to about 0.3 part by weight of a dye selected from the group consisting of non-ionic and anionic water-soluble dyes.

References Cited
UNITED STATES PATENTS 2,801,984  8/1957  Morgan et al. _____ 260—29.6

SAMUEL H. BLECH, *Primary Examiner.*

MURRAY TILLMAN, *Examiner.*

W. J. BRIGGS, Sr., *Assistant Examiner.*